US009234975B2

(12) United States Patent
De Meersman

(10) Patent No.: US 9,234,975 B2
(45) Date of Patent: Jan. 12, 2016

(54) DEVICE AND METHOD FOR DEGHOSTING P-WAVES

(75) Inventor: Kristof De Meersman, Calgary (CA)

(73) Assignee: CGGVERITAS SERVICES SA, Massy (FR)

(*) Notice: Subject to any disclaimer, the term of this patent is extended or adjusted under 35 U.S.C. 154(b) by 691 days.

(21) Appl. No.: 13/569,501

(22) Filed: Aug. 8, 2012

(65) Prior Publication Data

US 2013/0128695 A1 May 23, 2013

Related U.S. Application Data

(60) Provisional application No. 61/560,895, filed on Nov. 17, 2011.

(51) Int. Cl.
*G01V 1/36* (2006.01)

(52) U.S. Cl.
CPC .......... *G01V 1/36* (2013.01); *G01V 2210/1429* (2013.01); *G01V 2210/56* (2013.01)

(58) Field of Classification Search
CPC ............ G01V 1/36; G01V 2210/1429; G01V 2210/56
USPC ...................................................... 367/38, 43
See application file for complete search history.

(56) References Cited

U.S. PATENT DOCUMENTS

| | | | | |
|---|---|---|---|---|
| H001529 | H * | 5/1996 | Schneider et al. | 367/54 |
| 8,792,299 | B2 * | 7/2014 | Soubaras | 367/21 |
| 2009/0238036 | A1 * | 9/2009 | Robertsson et al. | 367/24 |

FOREIGN PATENT DOCUMENTS

WO WO 2010082131 A2 * 7/2010

* cited by examiner

*Primary Examiner* — Daniel L Murphy
(74) *Attorney, Agent, or Firm* — Patent Portfolio Builders PLLC

(57) ABSTRACT

Computing device and method for determining primary and ghost components from recorded P-waves. The method includes receiving seismic data (R, V) with regard to the P-waves, wherein the seismic data includes vertical and radial components recorded with a buried two-component receiver; calculating with a processor a primary component (P) and a ghost component (G) from the vertical and radial components; and computing an image of a subsurface based on the primary and ghost components (P, G). The P-waves form a plane wave.

17 Claims, 10 Drawing Sheets

402 420 412D 400 412E 410D 410E 404 406 T R 0 V 412 410 412B 410C 408 414 412A 412C 410B 416 410A 200
202
204
206
208
210
210A
210B
210C
212
212A
212B
212C
214
216
220

T
0
V
R
400
402
404
406
408
410
410A
410B
410C
410D
410E
412
412A
412B
412C
412D
412E
414
416
420

DEVICE AND METHOD FOR DEGHOSTING P-WAVES

CROSS REFERENCE TO RELATED APPLICATIONS

This application claims priority and benefit from Provisional Patent Application No. 61/560,895, filed Nov. 17, 2011, for "P-Wave Refraction Deghosting on Buried 3C Land Data," the entire contents of which are incorporated herein by reference.

BACKGROUND

1. Technical Field

Embodiments of the subject matter disclosed herein generally relate to methods and systems and, more particularly, to mechanisms and techniques for deghosting seismic data recorded with land buried multi-component seismic receivers.

2. Discussion of the Background

During the past years, interest in monitoring oil and/or gas reserves has increased. Time-lapse (or 4D) seismic monitoring of producing oil fields is an accepted method for optimization of field development and product recovery, providing significant improvements in recovery rates and savings in drilling costs.

Time-lapse seismic reservoir monitoring is the comparison of 3D seismic surveys at two or more points in time. Time-lapse seismic reservoir monitoring also has potential for increasing ability to image fluid movement between wells. A traditional configuration for achieving a 4D seismic monitoring is illustrated in FIG. 1. FIG. 1 shows a system 10 for the acquisition of seismic data. The system 10 includes plural receivers 12 positioned over an area 12*a* of a subsurface to be explored and in contact with the surface 14 of the ground. A number of vibroseismic sources 16 are also placed on the surface 14 in an area 16*a*, in a vicinity of the area 12*a* of the receivers 12. A recording device 18 is connected to the plurality of receivers 12 and placed, for example, in a station-truck 20. Each source 16 may be composed of a variable number of vibrators, typically between 1 and 5, and may include a local controller 22. Alternatively, the source may be a shallow buried explosive charge or other known devices for generating a seismic source, e.g., a metal plate placed on the ground and hammered with a hammer. A central controller 24 may be present to coordinate the shooting times of the sources 16. A GPS system 26 may be used to time-correlate the sources 16 and the receivers 12.

With this configuration, sources 16 are controlled to generate seismic waves, and the plurality of receivers 12 record waves reflected by the oil and/or gas reservoirs and other structures. The seismic survey may be repeated at various time intervals, e.g., months or years apart, to determine changes in the reservoirs. Although repeatability of source and receiver locations is generally easier to achieve onshore, the variations caused by changes in near-surface can be significantly larger than reservoir fluid displacement, making time-lapse 4D seismic acquisition and repeatability challenging. Thus, variations in seismic velocity in the near-surface are a factor that impacts repeatability of 4D surveys.

Thus, an aim for reservoir monitoring is to measure velocity variations in the subsurface by measuring small differences in the first arrival times of the refracted waves. These arrival time changes are typically measured using cross-correlations, which are biased by velocity changes in the near-surface layer. When using a shallow buried recording system, the waves arriving at the recorder (up-going energy) are not biased by velocity changes in the rocks above. However, the waves that reflect from the earth's surface back into the earth are affected. Typically both wave fields are recorded within close temporal proximity and their signals interfere. This makes it difficult to extract the unbiased information that is provided by the up-going energy. When the two wave-fields are separated, it is possible to measure velocity changes in the layers below the receivers that are not affected by velocity changes in the near-surface layer above the buried receivers.

Thus, up- and down-going energies may be used for monitoring the reservoir. Various algorithms for separating up-going and down-going energies are known. However, these algorithms are affected by the velocity of the ghost in the layer between the earth's surface and the burial horizon of the receivers for the case of buried receivers. The change in the velocity, spatially and/or over time, affects the delay time for the ghost and, thus, may cause problems for the algorithms that "pick" the first arrival times.

Thus, there is a need for developing a device and a method for better deghosting the recorded seismic energy.

SUMMARY

According to one exemplary embodiment, there is a method for determining primary and ghost components from P-waves recorded in near-surface conditions. The method includes a step of receiving seismic data (R, V) with regard to the P-waves, wherein the seismic data includes vertical and radial components recorded with a buried two-component receiver; a step of calculating with a processor a primary component (P) and a ghost component (G) from the vertical and radial components; and a step of computing an image of a subsurface based on the primary and ghost components (P, G). The P-waves form a plane wave.

According to another exemplary embodiment, there is a computing device for determining primary and ghost components from P-waves recorded in near-surface conditions. The computing device includes an interface configured to receive seismic data with regard to the P-waves, wherein the seismic data includes vertical and radial components recorded with a buried three-component receiver and a processor connected to the interface. The processor is configured to calculate a primary component and a ghost component from the vertical and radial components and also to compute an image of a subsurface based on the primary and ghost components wherein the P-waves form a plane wave.

According to another exemplary embodiment, there is a method for determining primary and ghost components from P-waves recorded in near-surface conditions. The method includes a step of receiving seismic data with regard to the P-waves, wherein the seismic data includes vertical and radial components recorded with a buried three-component receiver, a step of calculating with a processor a primary component and a ghost component from the vertical and radial components, and a step of computing an image of a subsurface based on the primary and ghost components. The P-waves form a plane wave, and the near-surface conditions describe a part of the subsurface between the buried three-component receiver and a surface of the earth.

According to still another exemplary embodiment, there is a computer readable medium including computer executable instructions, wherein the instructions, when executed by a processor, implement the above-noted methods.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a seismic system having three-component buried receivers that record refracted P-waves. However, the embodiments to be discussed next are not limited to refracted P-waves and/or three-component buried receivers.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a method for separating primary and ghost components. The method includes a step of receiving seismic data recorded with buried three-component receivers. The seismic data includes both radial and vertical components. The method includes a step of transforming the radial and vertical components into primary and ghost components (or energy). The method further includes a step of calculating with a processor a primary component (P) and a ghost component (G) from the vertical and radial components. Optionally, the method computes an image of a subsurface based on the primary and ghost components (P, G). The P-waves form a plane wave.

Figure 1:
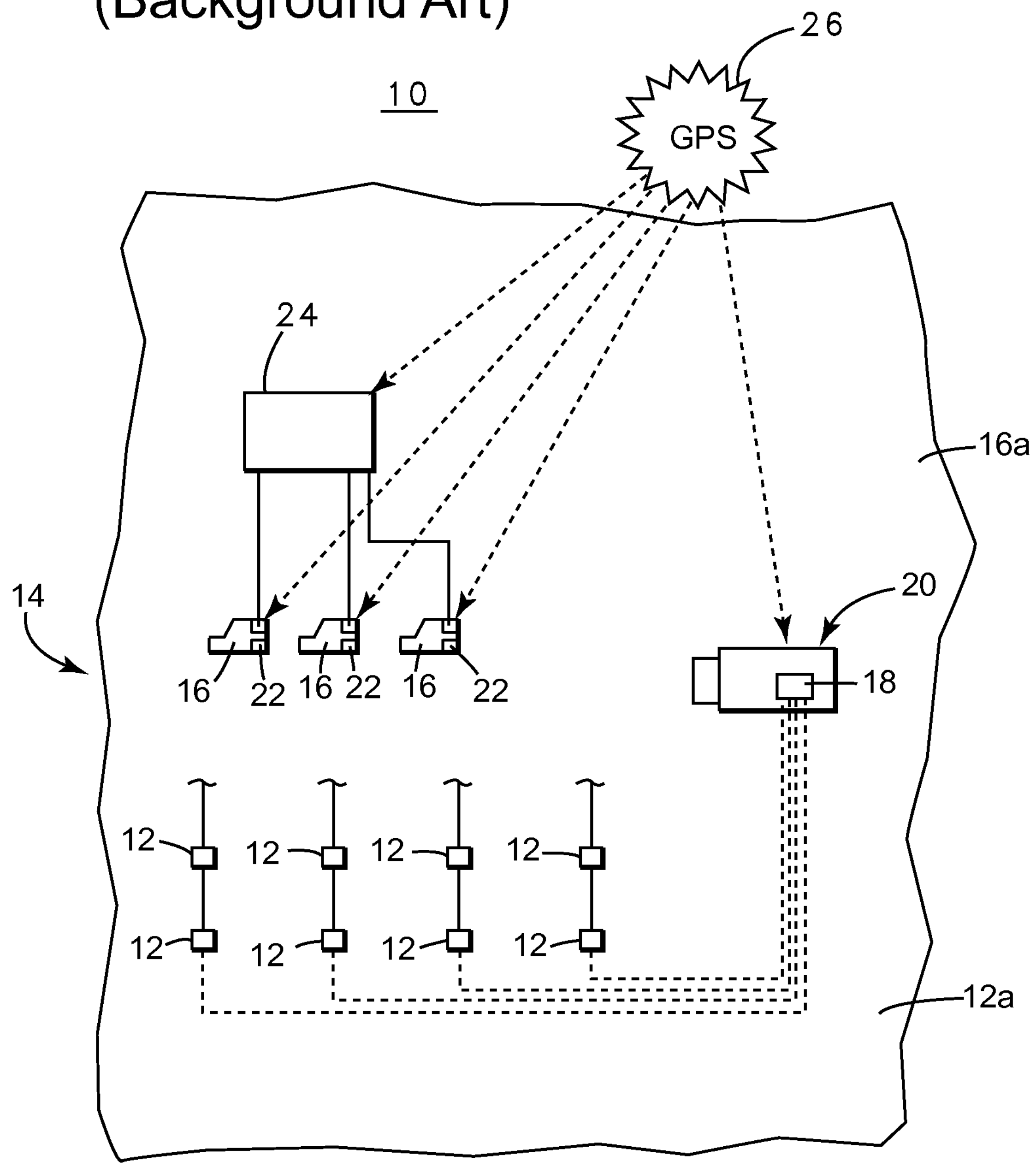
FIG. 1 is a schematic diagram of a conventional onshore seismic data acquisition system.
Figure 2:
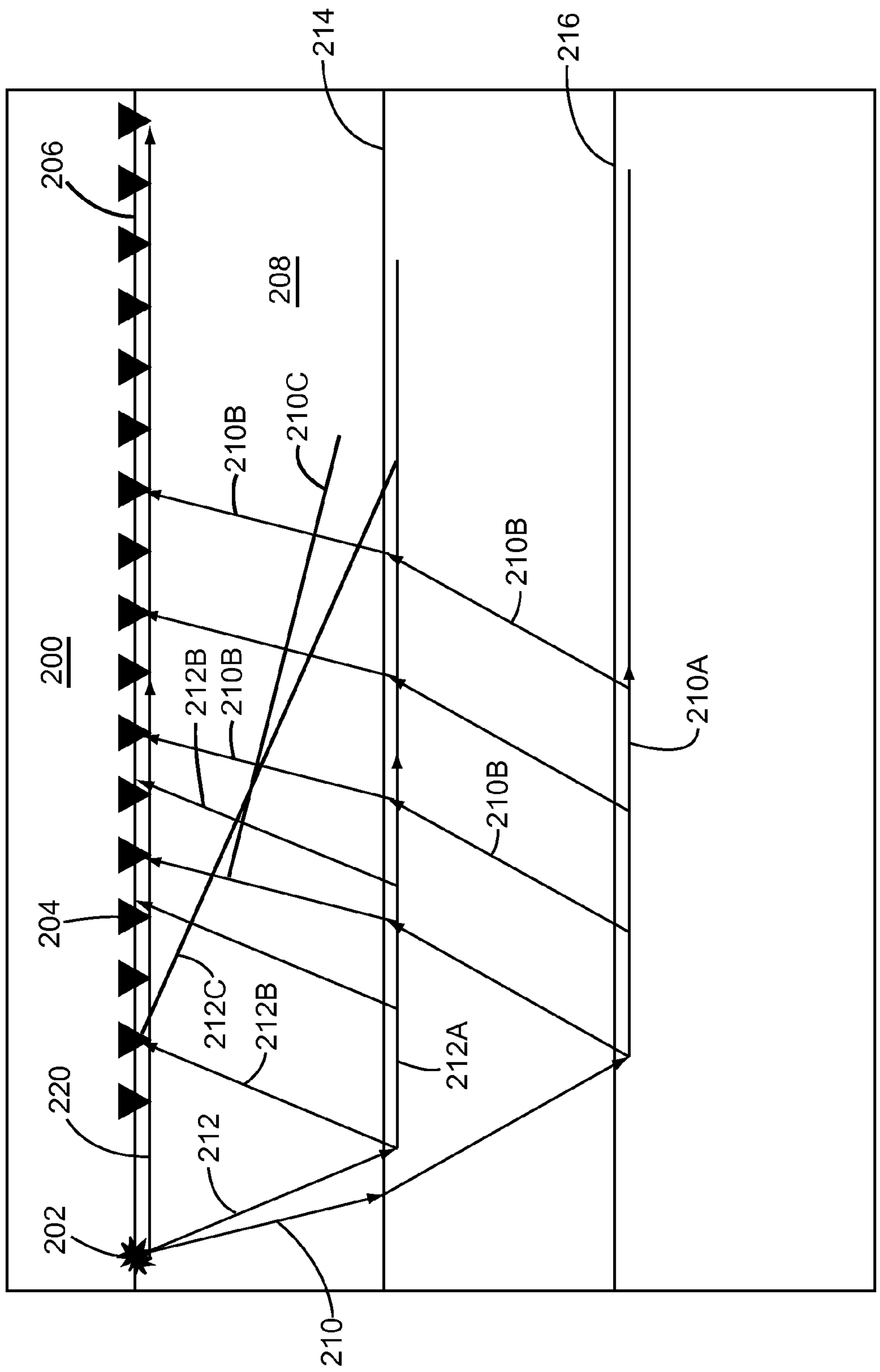
FIG. 2 is a schematic diagram of a source and plural seismic receivers provided on the earth's surface.

Prior to introducing the novel algorithm, it is believed to be in order to discuss the basics of a refraction land survey. FIG. 2 schematically shows a seismic system 200 having a seismic source 202 and plural seismic receivers 204 distributed on the earth's surface 206. The seismic source 202 emits energy into the subsurface 208. The energy is illustrated by two P-waves 210 and 212. The receivers 204 are vertically-oriented receivers (i.e., one-component receivers).

P-wave 210 propagates through a first interface 214 and is refracted at a second interface 216. The P-waves obey Snell's law and at some point, the angle of refraction causes the wave to propagate horizontally (at critical angle) as illustrated by wave 210A. Such horizontal wave is called a head-wave or refracted wave. It emits energy back to the surface 206 at a take-off angle that is equal to the critical angle. FIG. 2 shows plural waves 210B sent back to the surface 206 and being recorded by receivers 204. Similarly, the P-wave 212 enters the subsurface 208 and is refracted at the first interface 214. The refracted wave 212A propagates along the first interface 214 and sends plural waves 212B to the surface. These waves are also recorded by the receivers 204.

Figure 3:
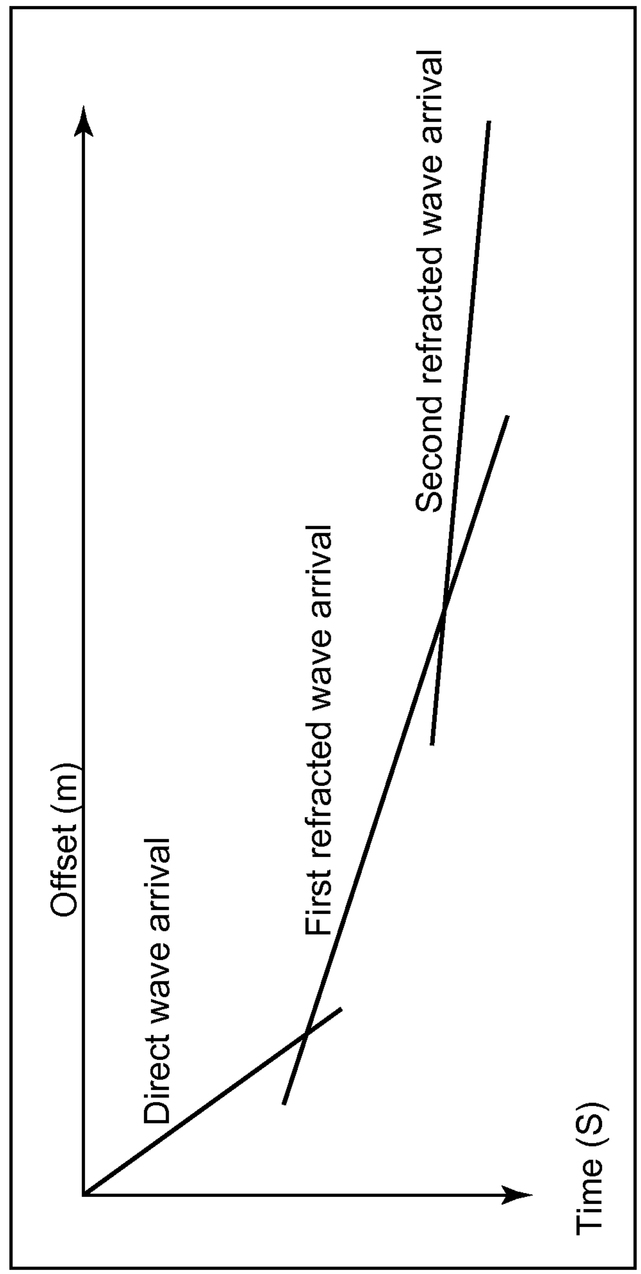
FIG. 3 illustrates a seismic profile of various arrivals.

The waves 212B form a wave-front 212C and the waves 210B form a wave-front 210C. These fronts are illustrated in FIG. 2. FIG. 2 also shows a direct wave 220 that propagates from the source 202 to the receivers 204, along the surface of the earth. The direct waves and the refracted waves 212B and 210B make up the direct arrival, the first seismic arrivals and the second seismic arrivals that are recorded on a seismic profile as shown in FIG. 3.

Figure 4:
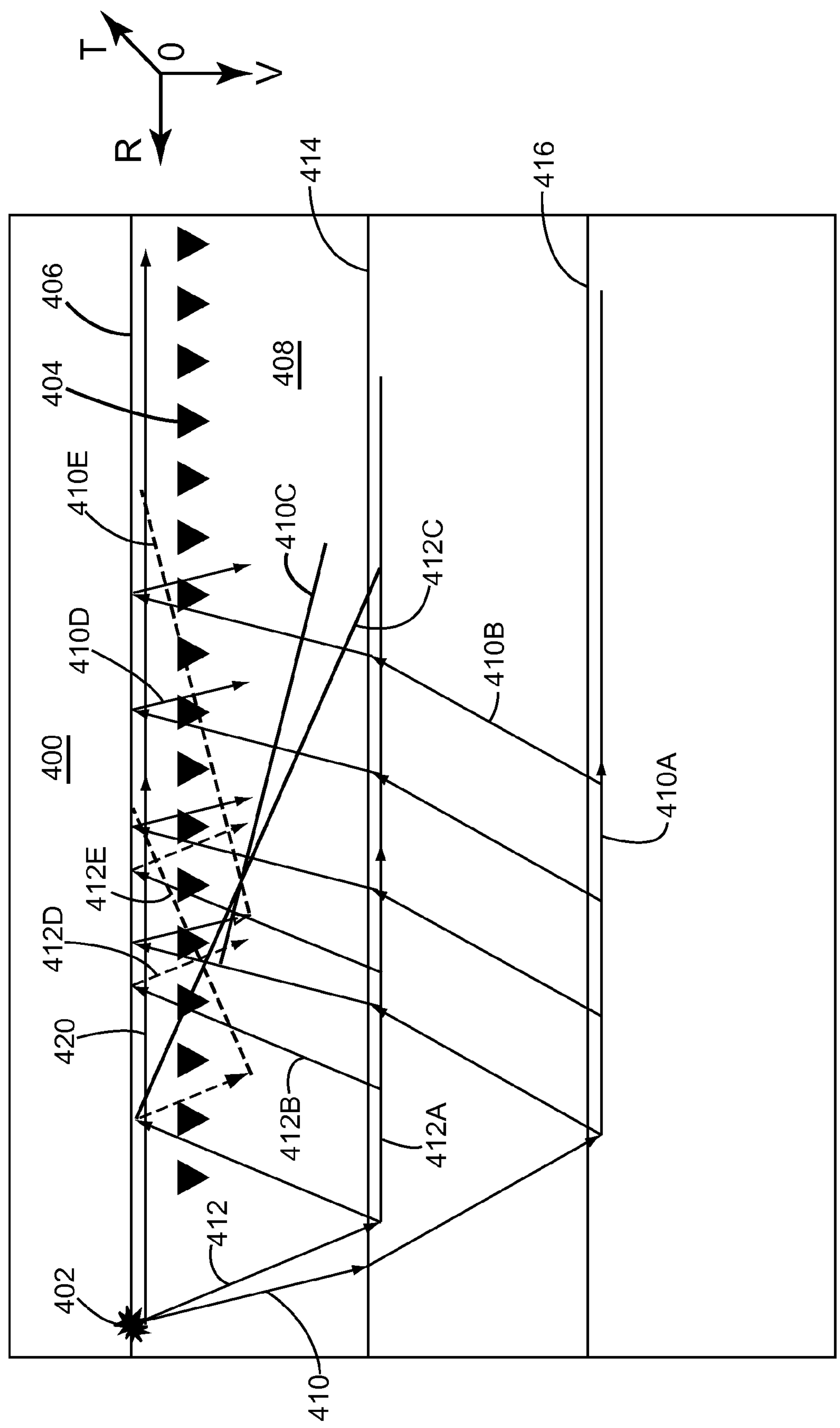
FIG. 4 illustrates a system using buried multi-component receivers for collecting seismic data.

A buried multi-component refraction system 400 is illustrated in FIG. 4 and differs from the seismic system 200 of FIG. 2 at least because the receivers are buried below the earth's surface and the receivers are three components, i.e., record seismic energy in mutually orthogonal directions, e.g., vertical (V), radial (R) and transverse (T). The transverse direction is ignored in the following because it should not include refracted energy.

System 400 has many similarities with system 200 and, thus, the same elements in the two systems have identical last two digits in the reference numbers. However, the receivers 404 (3C receivers) of system 400 record the refracted wavefield twice. The receivers 404 record the up-going wave-fields 410B and 412B, and also the down-going wave-fields (that are reflected at the earth's surface 406) 410D and 412D. The down-going wave-fields form wave-fronts 410E and 412E, respectively.

Figure 5A:
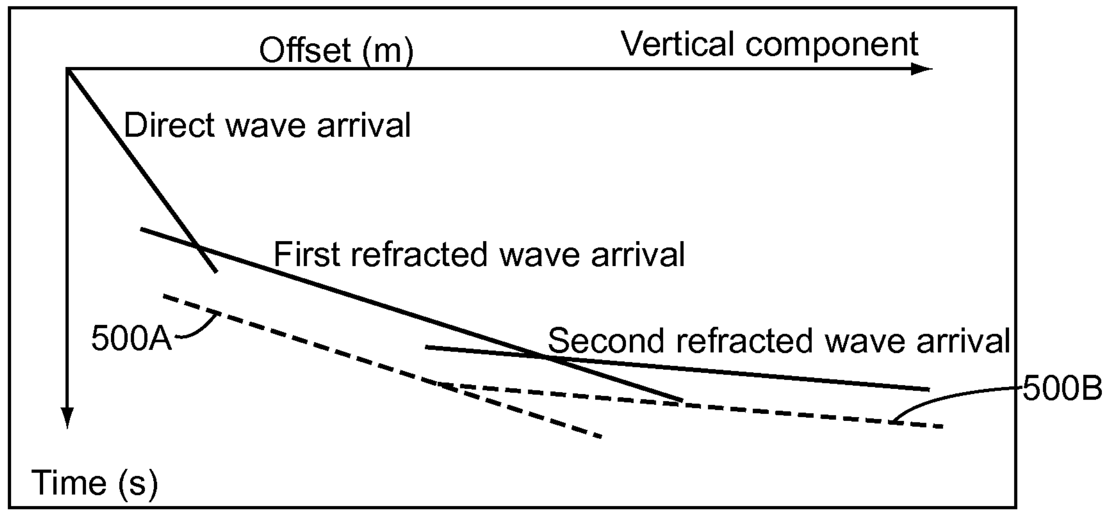
FIGS. 5A and 5B illustrate seismic profiles for vertical and radial components of various arrivals.
Figure 5B:
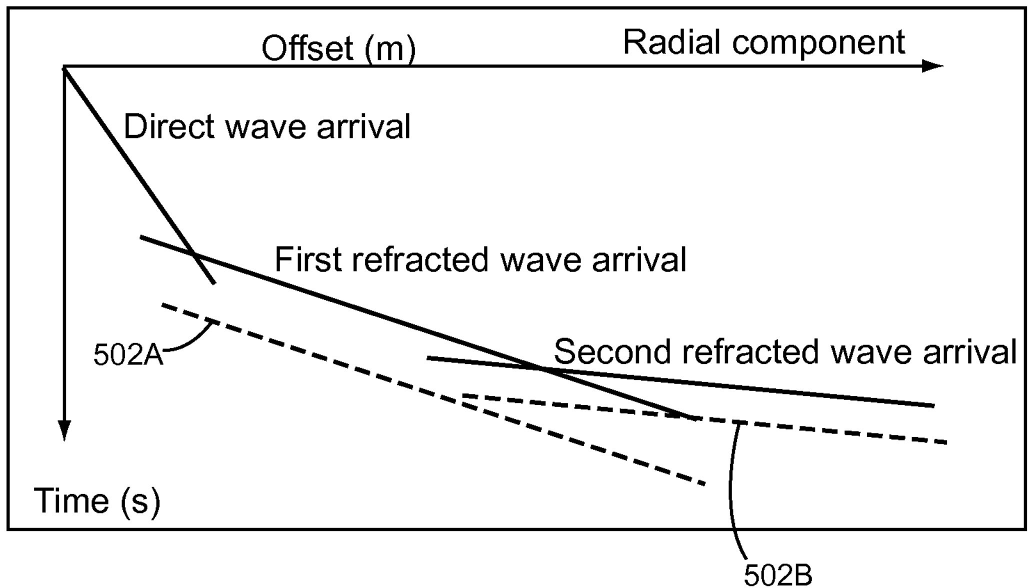

The up-going wave-fields 4108 and/or 4128 are called the primary, while the down-going wave-fields 410D and/or 412D are called the ghost. The refraction profile for the vertical component (vertical geophone) that will be recorded by the system 400 is illustrated in FIG. 5A, and the same profile for the radial component (radial geophone) is illustrated in FIG. 5B. On the vertical component illustrated in FIG. 5A, the ghost 500A of the first refracted wave arrival and the ghost 500B of the second refracted wave arrival have the same polarity as their primary refractions. However, on the radial component illustrated in FIG. B, the ghosts 502A and 502B have opposite polarities relative to their primary refractions. The direct arrival has no ghost in this case because the source is vertically positioned above the receivers.

For P-waves and receiver depths on the order of 10-20 meters, the arrival time difference between primary and ghost is typically small, e.g., 10 to 15 ms. The arrival time differences decrease with an increase of the refraction number. Thus, the ghost delay is larger for the first refraction than it is for the second and next refractions.

Figure 6A:
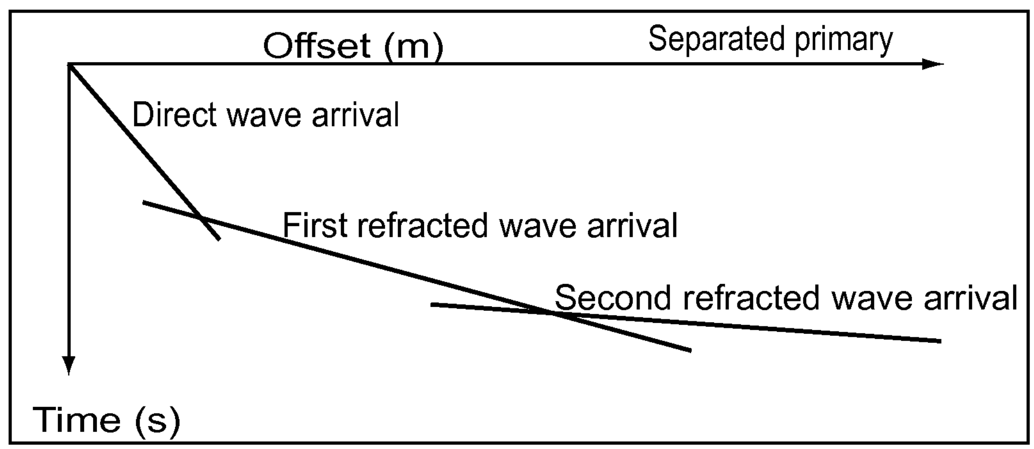
FIGS. 6A and 6B illustrate seismic profiles for primary and ghost components according to an exemplary embodiment.
Figure 6B:
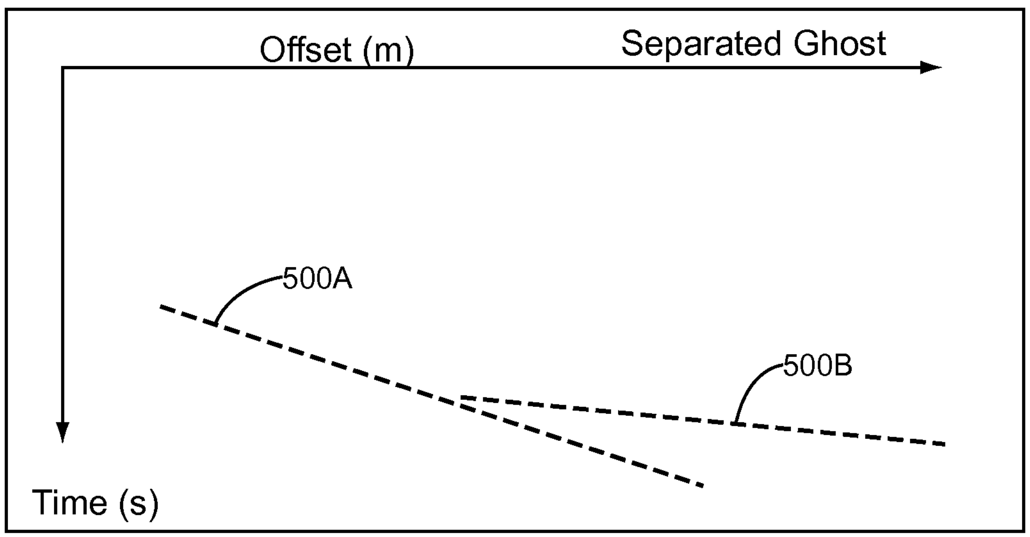

The novel algorithm to be discussed next aims to separate the primary arrivals from the ghost arrivals (deghost) as schematically illustrated in FIGS. 6A and 6B. It is assumed in the following that each individual refraction or segment can be approximated as a plane wave.

Figure 7:
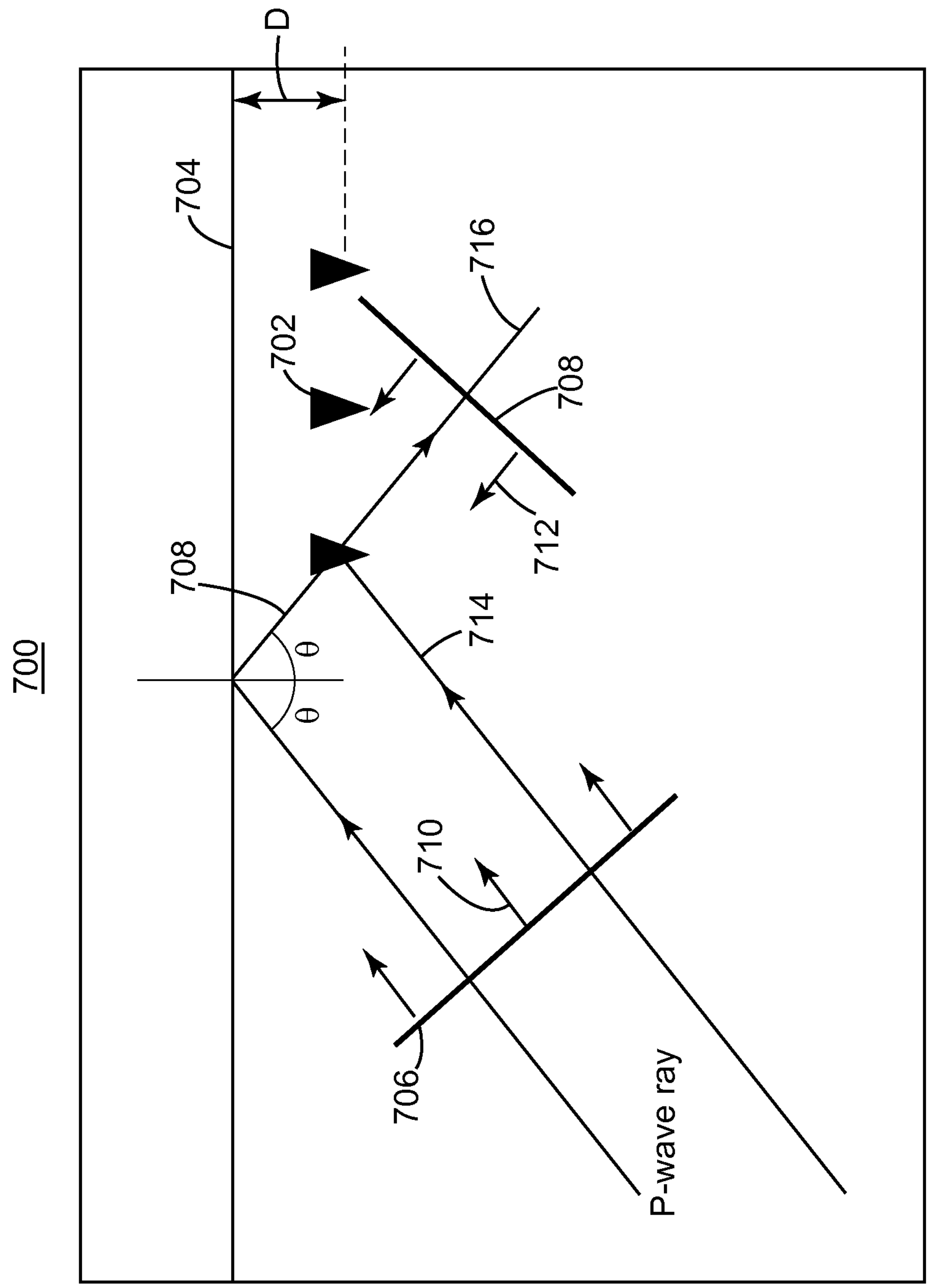
FIG. 7 is a schematic diagram of primary and ghost components recorded with buried multi-component receivers according to an exemplary embodiment.

With the above-noted framework, it is now considered the setup illustrated in FIG. 7 for developing the novel algorithm. FIG. 7 shows a plurality of 3C receivers 702 being buried underground, below the earth's surface 704 by a given distance D. Primary 706 and ghost 708 wave-fronts are recorded at the same receiver but with different arrival times and different polarizations 710 and 712. The primary wave-fields 714, ghost wave-fields 716 and a reflection angle θ are also illustrated in the figure.

Figure 8:
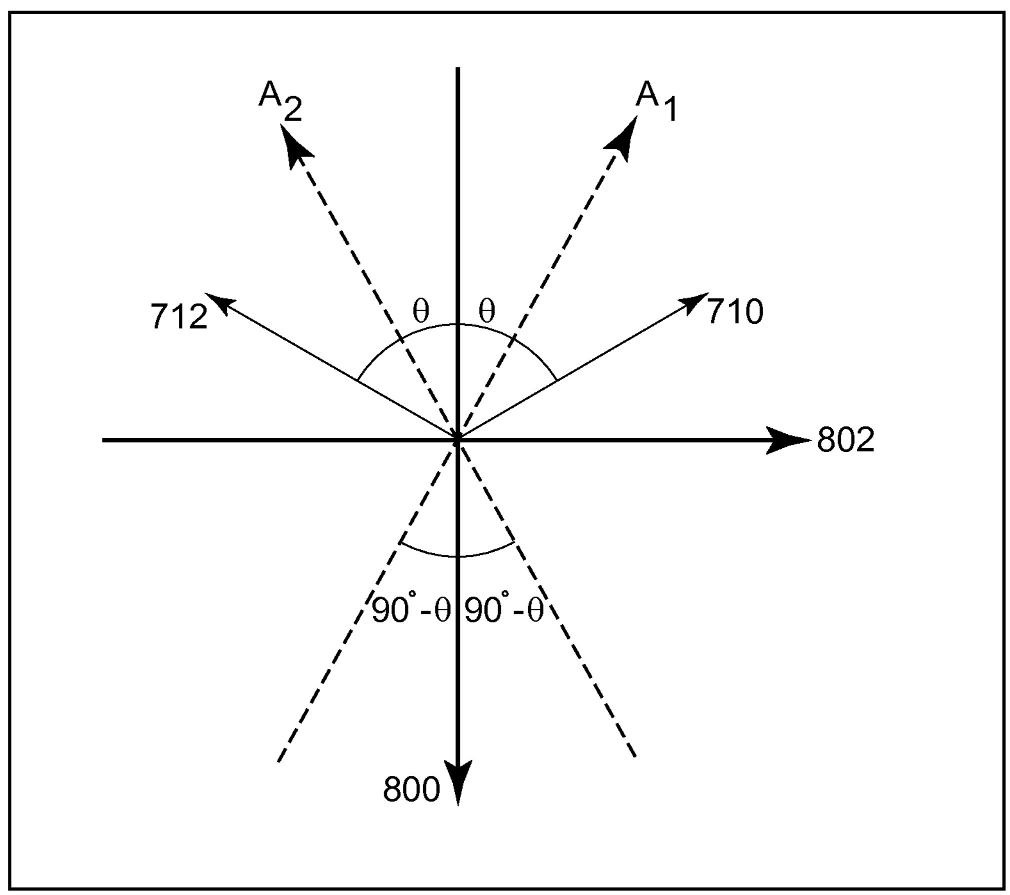
FIG. 8 is a schematic diagram illustrating vertical and radial components and primary and ghost components according to an exemplary embodiment.

FIG. 8 illustrates the reference framework including the vertical component 800 and the radial component 802. The primary polarization 710 and the ghost polarization 712 are represented relative to the vertical and radial components.

With these notations, the recorded P-wave refraction energy on the vertical (V) and radial (R) components of the buried receivers may be written in terms of a primary energy (P), a ghost energy (G) and a ray angle θ (that is measured from vertical) as follows:

$$\begin{bmatrix} V \\ R \end{bmatrix} = \begin{bmatrix} -\cos(\theta) & -\cos(\theta) \\ \sin(\theta) & -\sin(\theta) \end{bmatrix} \begin{bmatrix} P \\ G \end{bmatrix} \Leftrightarrow d = Am. \quad (1)$$

Equation (1) relates to a coordinate system where the vertical axis points down and the radial direction points away from the source. It is noted that V and R are measured, the A-matrix may be estimated, and the P and G components are desired to be determined and, thus, calculated based on equation (1). Up-down separation of the refracted P-waves can be achieved by inverting the A-matrix, yielding the true-amplitude expressions for the up-going and down-going refracted P-waves. This is expressed as:

$$A^{-1} = \frac{1}{\sin(2\theta)} \begin{bmatrix} -\sin(\theta) & \cos(\theta) \\ -\sin(\theta) & -\cos(\theta) \end{bmatrix}, \quad (2)$$

where the term 1/sin(2θ) is a scaling factor. It is noted that $A^{-1}$ is not defined for θ=0 (vertical incidence or zero offset) and for θ=90 (horizontal incidence). However, these two cases should not happen for refracted waves. The P and G components may be separated by using axes A1 and A2 shown in FIG. 8. It is noted that a projection of the P and G components on axis A1 has no primary energy, only ghost energy, and the opposite is true for axis A2. The projection of the P and G components on axis A1 is given by:

$$P_{A1component} = \frac{1}{\sin(2\theta)}(-V\sin(\theta) + R\cos(\theta)), \text{ and} \quad (3)$$

the projection of the P and G components on axis A2 is given by:

$$G_{A2component} = \frac{1}{\sin(2\theta)}(-V\sin(\theta) - R\cos(\theta)). \quad (4)$$

These projections point in a general direction opposite that of the radial component R. This will cause a polarity reversal between the estimates of P and G and the data originally recorded on the radial component R. To correct for this, it is possible to multiply equations (3) and (4) by −1 and obtain $$P_{A1component} = \frac{1}{\sin(2\theta)}(V\sin(\theta) - R\cos(\theta)), \text{ and} \quad (3')$$

-continued $$G_{A2component} = \frac{1}{\sin(2\theta)}(V\sin(\theta) + R\cos(\theta)). \quad (4')$$

A grid search is performed over ray angles θ to find a direction for which optimal separation into up- and down-going energy can be achieved. This step results in the θ angle being around 30°. However, this angle depends on the local geology and in other experiments this angle may have a different value. In theory, the angle theta can have any value between 0° and 90°, though in practice, it is expected to be in range between 10° and 45°. It is noted that this angle may change as the algorithm is applied to another subsurface. Thus, this novel method uses measurements obtained from buried receivers to separate and estimate the primary and ghost components. Having the primary and ghost components, it is possible to calculate various desirable quantities, e.g., an image of the surveyed subsurface, a velocity model of the subsurface, etc. Further, it is noted that an advantage of this method of separating the primary and ghost components based on land seismic data recorded with underground receivers is related to the time-lapse benefits, i.e., the up-going (primary) wave-field is not affected by time-lapse changes in the near-surface because this signal is recorded by the buried receivers, which may be below the weather layer. Therefore, any time-lapse change that is measured from the up-going wave-fields can be attributed to deeper layers and not to the near-surface. This is one advantage over conventional time-lapse acquisitions with receivers on the surface. Another advantage of the novel method is related to the fact that many conventional methods require that the buried receivers are more or less at equal depth. The novel method can do the separation independent of variations in burial depth. Another advantage of the novel method is related to the type of source used for the seismic survey, i.e., P-wave sources are more economical and readily available than S-wave sources.

Figure 9:
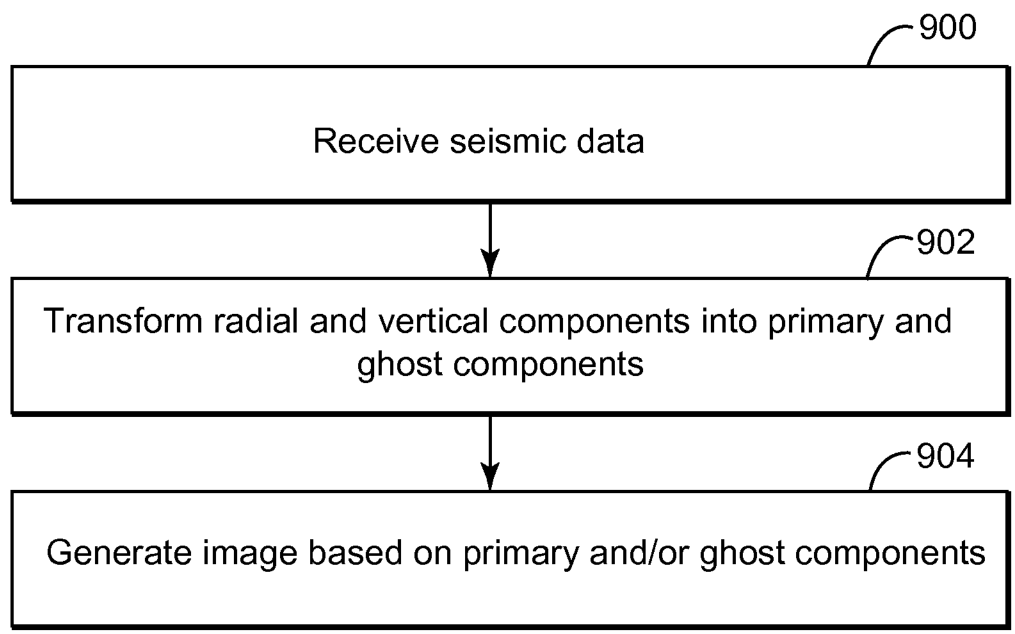
FIG. 9 if a flowchart of a method for deghosting P-waves recorded with buried multi-component receivers according to an exemplary embodiment.

A flowchart illustrating a method for deghosting the seismic data is now discussed with regard to FIG. 9. In step 900, seismic data is received. The seismic data is recorded with buried 3C receivers. The data is processed in step 902 to transform it from radial and vertical components to primary and ghost components as discussed above with reference to FIGS. 7 and 8 and based on equations (3) and (4). The primary and ghost components are then used, for example, to generate in step 904 an image of the surveyed subsurface. Such a step may be implemented in a computing device.

Although the above embodiments have been discussed with regard to a three-component receiver, it is noted that a two-component receiver can also be used for determining the primary and the ghost. The two-component receiver has (i) a first single receiver oriented along a vertical line and configured to record the vertical component, and (ii) a second single receiver oriented along a line extending between a source and the two-component receiver and configured to record the radial component. It is also possible to replace the radial component with a hydrophone. Further, it is also possible to use buried, vertical-hydrophone and 3C+hydrophone receivers.

Figure 10:
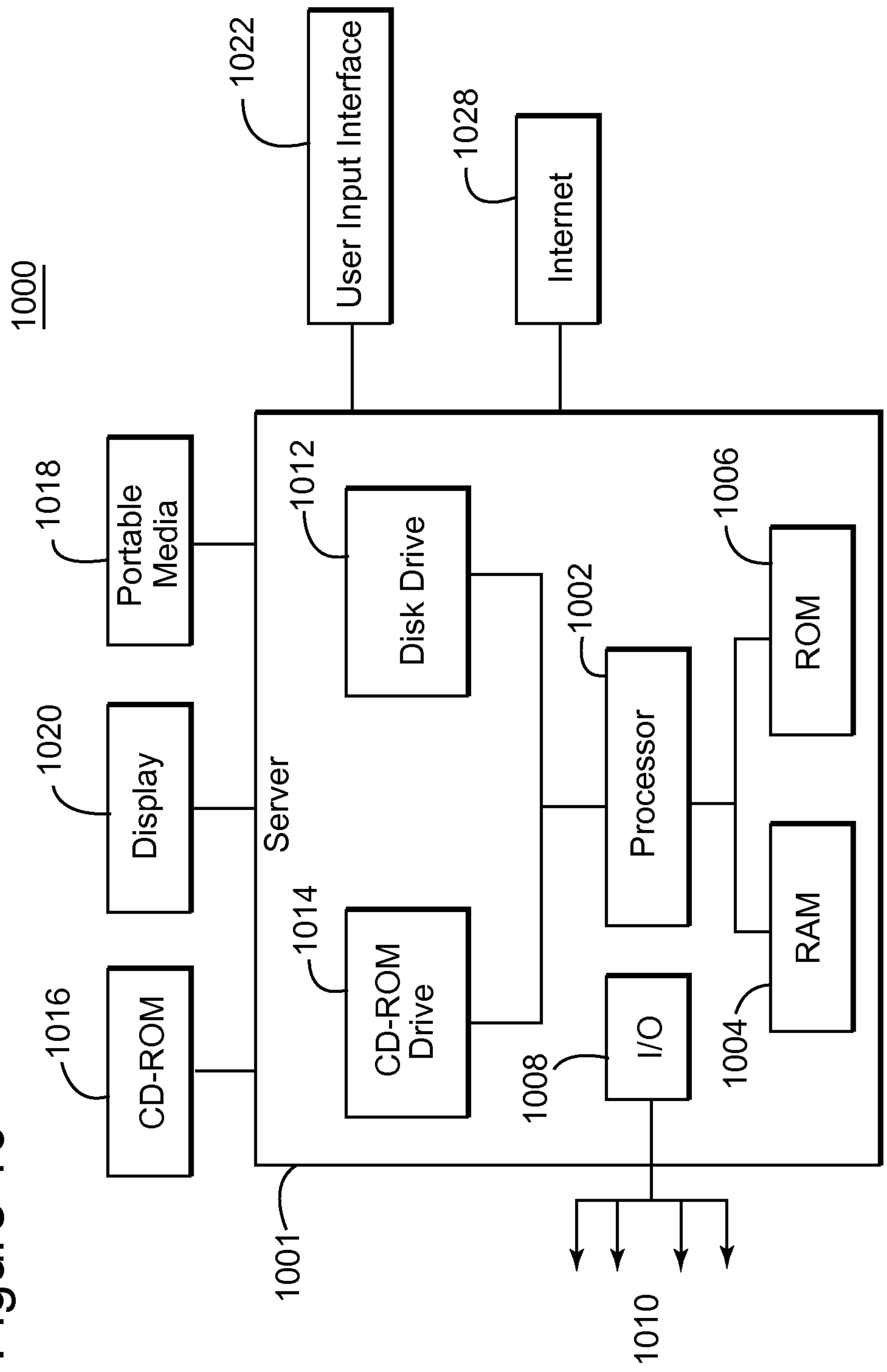
FIG. 10 is a schematic diagram of a computing device.

For purposes of illustration and not of limitation, an example of a representative computing device capable of carrying out calculations in accordance with the exemplary embodiments is illustrated in FIG. 10. Hardware, firmware, software or a combination thereof may be used to perform the various steps and operations described herein.

The exemplary computing device 1000 suitable for performing the activities described in the exemplary embodiments may include a server 1001. Such a server 1001 may include a central processor (CPU) 1002 coupled to a random access memory (RAM) 1004 and to a read-only memory (ROM) 1006. The ROM 1006 may also be other types of storage media to store programs, such as programmable ROM (PROM), erasable PROM (EPROM), etc. The processor 1002 may communicate with other internal and external components through input/output (I/O) circuitry 1008 and bussing 1010, to provide control signals and the like. The processor 1002 carries out a variety of functions as are known in the art, as dictated by software and/or firmware instructions.

The server 1001 may also include one or more data storage devices, including hard disk drives 1012, CD-ROM drives 1014, and other hardware capable of reading and/or storing information such as DVD, etc. In one embodiment, software for carrying out the above-discussed steps may be stored and distributed on a CD-ROM 1016, portable media 1018 or other form of media capable of portably storing information. These storage media may be inserted into, and read by, devices such as the CD-ROM drive 1014, the disk drive 1012, etc. The server 1001 may be coupled to a display 1020, which may be any type of known display or presentation screen, such as LCD, LED display, plasma display, cathode ray tubes (CRT), etc. A user input interface 1022 is provided, including one or more user interface mechanisms such as a mouse, keyboard, microphone, touch pad, touch screen, voice-recognition system, etc.

The server 1001 may be coupled to other computing devices, such as a landline and/or wireless terminals, via a network. The server may be part of a larger network configuration as in a global area network (GAN) such as the Internet 1028, which allows ultimate connection to the various landline and/or mobile client/watcher devices.

The disclosed exemplary embodiments provide a system and a method for calculating primary and ghost components based on seismic data recorded with buried seismic 3C recorders. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for determining primary and ghost components from refracted P-waves recorded in near-surface conditions, the method comprising:

receiving seismic data (R, V) with regard to the refracted P-waves, wherein the seismic data includes vertical and radial refracted components recorded with a buried two-component receiver;

calculating with a processor a primary component (P) and a ghost component (G) from the vertical and radial refracted components; and computing an image of a subsurface based on the primary and ghost components (P, G), wherein the refracted P-waves form a plane wave.

2. The method of claim 1, wherein the near-surface conditions describe properties of the ground located above the buried two-component receiver.

3. The method of claim 1, wherein the refracted P-waves are refracted from a structure in the subsurface.

4. The method of claim 1, wherein the primary component (P) is given by:

$$P = \frac{1}{\sin(2\theta)}(V\sin(\theta) - R\cos(\theta)),$$

where θ is an incidence angle of the primary component (P) relative to a normal of an earth's surface.

5. The method of claim 1, wherein the ghost component (G) is given by:

$$G = \frac{1}{\sin(2\theta)}(V\sin(\theta) + R\cos(\theta)),$$

where θ is an incidence angle of the primary component (P) relative to a normal of an earth's surface.

6. The method of claim 1, wherein the two-component receiver has a first single receiver oriented along a vertical line and configured to record the vertical refracted component and a second single receiver oriented along a line between a source and the two-component receiver and configured to record the radial refracted component.

7. A computing device for determining primary and ghost components from refracted P-waves recorded in near-surface conditions, the computing device comprising:

an interface configured to receive seismic data with regard to the refracted P-waves, wherein the seismic data includes vertical and radial refracted components recorded with a buried three-component receiver; and a processor connected to the interface and configured to, calculate a primary component and a ghost component from the vertical and radial refracted components; and compute an image of a subsurface based on the primary and ghost components, wherein the refracted P-waves form a plane wave.

8. The computing device of claim 7, wherein the near-surface conditions describe properties of the ground located above the buried three-component receiver.

9. The computing device of claim 7, wherein the refracted P-waves are refracted from a structure in the subsurface.

10. The computing device of claim 7, wherein the primary component (P) is given by:

$$P = \frac{1}{\sin(2\theta)}(V\sin(\theta) - R\cos(\theta)),$$

where θ is an incidence angle of the primary component (P) relative to a normal of an earth's surface.

11. The computing device of claim 7, wherein the ghost component (G) is given by:

$$G = \frac{1}{\sin(2\theta)}(V\sin(\theta) + R\cos(\theta)),$$

where θ is an incidence angle of the primary component (P) relative to a normal of an earth's surface.

12. The computing device of claim 7, wherein the two-component receiver has a first single receiver oriented along a vertical line and configured to record the vertical refracted component and a second single receiver oriented along a line between a source and the two-component receiver and configured to record the radial refracted component.

13. A method for determining primary and ghost components from refracted P-waves recorded in near-surface conditions, the method comprising:

receiving seismic data with regard to the refracted P-waves, wherein the seismic data includes vertical and radial refracted components recorded with a buried three-component receiver;

calculating with a processor a primary component and a ghost component from the vertical and radial refracted components; and computing an image of a subsurface based on the primary and ghost components, wherein the refracted P-waves form a plane wave, and the near-surface conditions describe a part of the subsurface between the buried three-component receiver and a surface of the earth.

14. A computer readable medium including computer executable instructions, wherein the instructions, when executed by a processor, implement a method for determining primary and ghost components from refracted P-waves recorded in near-surface conditions, the method comprising:

receiving seismic data (R, V) with regard to the refracted P-waves, wherein the seismic data includes vertical and radial refracted components recorded with a buried three-component receiver;

calculating with a processor a primary component (P) and a ghost component (G) from the vertical and radial refracted components; and computing an image of a subsurface based on the primary and ghost components (P, G), wherein the refracted P-waves form a plane wave.

15. The medium of claim 14, wherein the primary component (P) is given by:

$$P = \frac{1}{\sin(2\theta)}(V\sin(\theta) - R\cos(\theta)),$$

where θ is an incidence angle of the primary component (P) relative to a normal of an earth's surface.

16. The medium of claim 14, wherein the ghost component (G) is given by:

$$G = \frac{1}{\sin(2\theta)}(V\sin(\theta) + R\cos(\theta)),$$

where θ is an incidence angle of the primary component (P) relative to a normal of an earth's surface.

17. The medium of claim 14, wherein the two-component receiver has a first single receiver oriented along a vertical line and configured to record the refracted vertical component and a second single receiver oriented along a line between a source and the two-component receiver and configured to record the radial refracted component.

* * * * *